United States Patent [19]

Miller et al.

[11] 3,969,068

[45] July 13, 1976

[54] METHOD FOR COAL FIRING GLASS FURNACES

[75] Inventors: Karl A. Miller, Denver; Clement V. Fogelberg, Arvada, both of Colo.

[73] Assignee: Tusco Engineering Co., Inc., Commerce City, Colo.

[22] Filed: Dec. 16, 1974

[21] Appl. No.: 533,388

[52] U.S. Cl. .............................. 432/13; 432/22; 432/20; 110/106; 65/136
[51] Int. Cl.² ...................................... F27B 14/00
[58] Field of Search ............... 432/13, 20, 22, 159, 432/175, 222; 110/106, 28 R; 65/135, 136, 337

[56] References Cited
UNITED STATES PATENTS

| | | | |
|---|---|---|---|
| 1,481,067 | 1/1924 | Pomeroy | 110/106 |
| 1,535,132 | 4/1925 | Renkin | 432/22 |
| 1,628,609 | 5/1927 | Newhouse | 110/106 |
| 1,941,410 | 12/1933 | Mulholland | 432/22 |
| 2,230,799 | 2/1941 | Hobbs | 110/106 |
| 3,193,268 | 7/1965 | Robertson et al. | 65/337 |
| 3,294,505 | 12/1966 | Garrison | 65/136 |
| 3,515,529 | 6/1970 | Love et al. | 65/136 |
| 3,523,781 | 8/1970 | Leveque | 65/136 |
| 3,592,622 | 7/1971 | Shepherd | 65/136 |
| 3,620,514 | 11/1971 | Geiger, Jr. | 432/22 |

*Primary Examiner*—John J. Camby
*Assistant Examiner*—Henry C. Yuen
*Attorney, Agent, or Firm*—Thomas W. O'Rourke

[57] ABSTRACT

Method and apparatus for direct coal firing of glass tank furnaces wherein pulverized coal entrained in an air stream is impelled through a nozzle into the furnace and combusted in the atmosphere directly above the melt in a glass furnace, to form a luminous flame, the direct coal firing preferably being used in conjunction with supplementary conventional heat sources.

7 Claims, 3 Drawing Figures

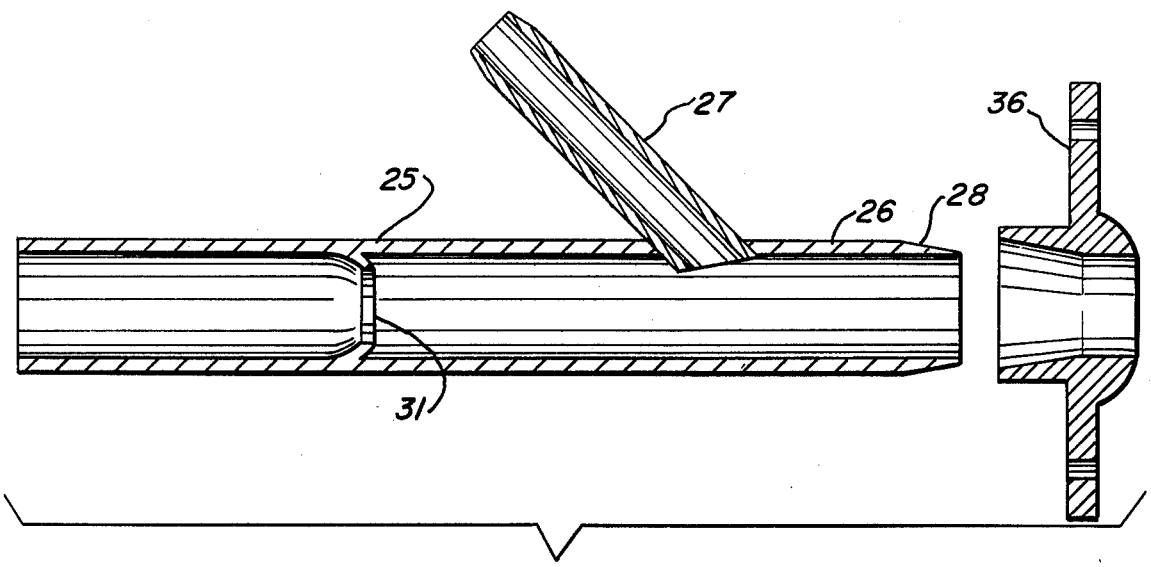
Fig_2
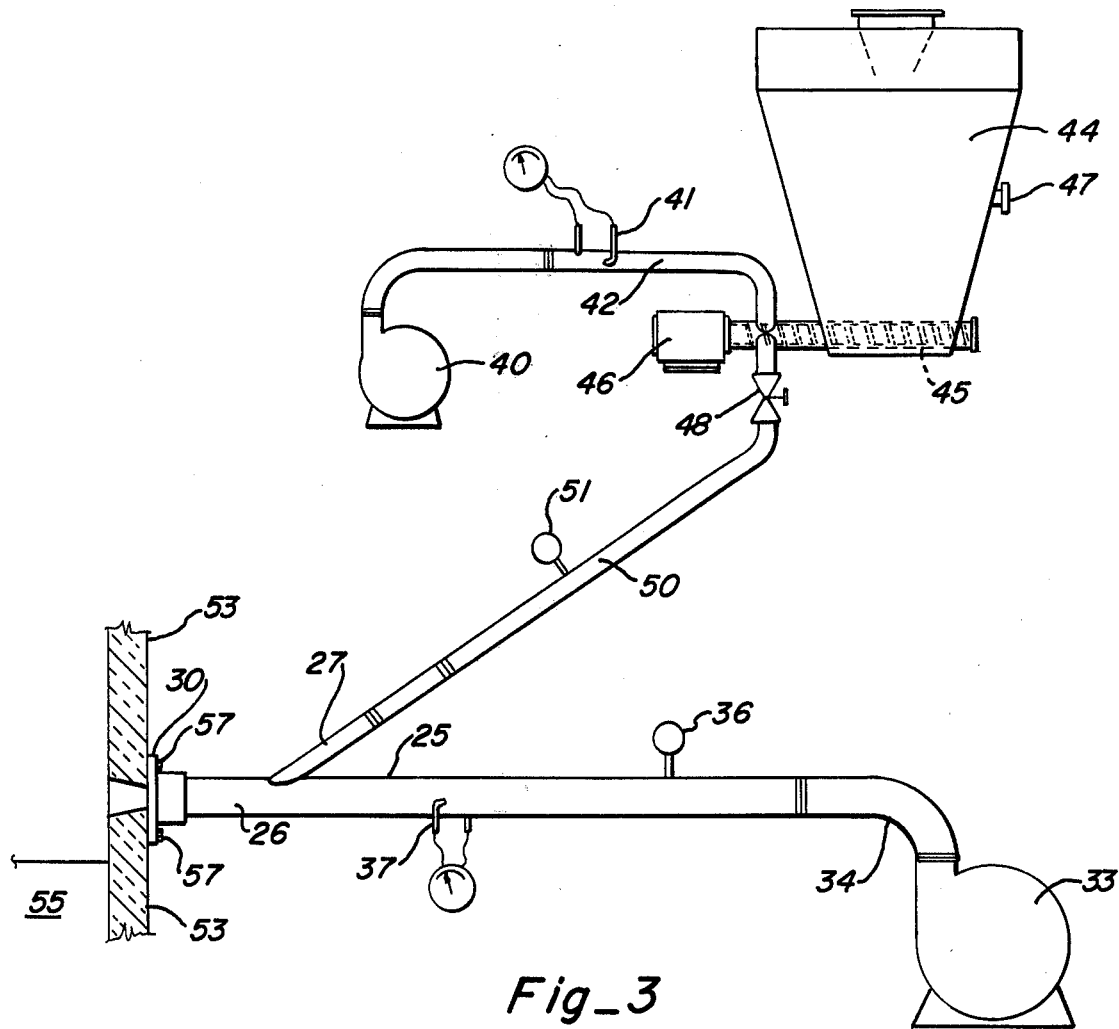
Fig_3

METHOD FOR COAL FIRING GLASS FURNACES

BACKGROUND OF THE INVENTION

1. Field of the Invention

The present invention relates generally to coal firing of glass tank furnaces, and more particularly to direct coal firing in which pulverized coal is combusted in the atmosphere immediately over the molten glass.

2. Description of the Prior Art

Coal firing per se has been in existence for many years. Fundamentally, indirect coal firing, i.e., through a heat exchange surface to protect the substance to be heated, is typified by the household furnace of the recent sort. Combustion products from the coal firing were, of course, maintained separate from the heated air. Similarly, a number of other substances have been heated by indirect coal firing. Early glass melting for hand-blown glass was accomplished by indirect heating. The automation of glassware production resulted in the location of glass plants at sites where natural gas was abundant. Thus, for many years gas and oil have been utilized to fuel tank furnaces for glass.

Pulverized coal firing is more conventionally utilized in conjunction with somewhat less demanding processes such as the production of cement, brick firing, metal reduction and steam power generation. Pulverized coal is supplied, usually in a fluidized manner, through a nozzle which functions in a manner somewhat analogous to that of a gas burner. The air utilized to carry the pulverized coal is, during combustion, largely employed to oxidize the coal. The resulting heat may be utilized either directly or indirectly. However, in the former instance, use has been with less sensitive processes such as ore processing, cement kilns, etc. U.S. Pat. No. 1,841,587 illustrates the known apparatus.

Heretofore, it has been almost unanimously accepted that the production of glass in a glass tank furnace was much too dependent upon the atmosphere conditions of the furnace to permit direct pulverized coal firing. For instance, in a "Discussion of Influence of Furnace Atmosphere on the Melting-Firing Rate of Soda-Ash Glasses," *Canadian Clay and Ceramics*, February, 1973 and S. B. Joshi et al, "The Effects of Gaseous Atmospheres on Factors Affecting Melting and Refining of Glass," *33rd Annual Conference on Glass Problems*, Ohio State, 1972, discuss and establish the critical importance of the atmosphere over the melting glass. Further, it is well known that coal contains a substantial ash residue which, being neither volatile nor combustible, would settle into the glass melt.

For these reasons, there appears to be no record of an attempt to utilize direct coal firing to supply or supplement the heat load required for the melting of glass in a glass tank furnace. The glass industry originally located in areas with abundant natural gas. More recently fuel oil and electricity have also been employed to supply the needed energy.

SUMMARY OF THE INVENTION

The present invention, which provides a heretofore unavailable improvement over previous means of utilizing energy sources in better supply, comprises a method and apparatus for direct firing of glass tank furnaces utilizing pulverized coal entrained in an air stream. The method and apparatus is compatible with the extreme requirements of glass tank furnaces and may be used, either constantly or intermittently, in conjunction with more conventional heating means such as oil, gas and/or electrical boosting or heating. Coal combusted according to the instant invention provides a desirable luminous flame even under reducing conditions.

Accordingly, an object of the present invention is to provide a new and improved method and apparatus for use in conjunction with glass tank furnaces for the direct pulverized coal firing of such furnaces.

Another object of the present invention is to provide a new and improved method and apparatus utilizing coal as a combustion material which may be interchanged with gas for the heating of glass tank furnaces.

Yet another object of the present invention is to provide a new and improved method and apparatus for direct coal firing which utilizes standard tank furnace configurations.

Still another object of the present invention is to provide a new and improved method and apparatus for direct coal firing of glass tank furnaces while maintaining conventional quality standards for the glass.

Yet another object of the present invention is to provide a new and improved method and apparatus for direct firing glass tank furnaces interchangeably utilizing coal as a more readily available energy source.

Still yet another object of the present invention is to provide a new and improved method and apparatus for direct firing of glass tank furnaces with coal in order to provide a luminous flame for more effective heating of the glass melt.

These and other objects and features of the present invention will become apparent from the following descriptions.

BRIEF DESCRIPTION OF THE DRAWINGS

In the drawings:

FIG. 2 is a partial schematic drawing of a burner assembly according to the instant invention; and FIG. 3 is a schematic illustration of the coal-firing apparatus for glass furnaces according to the instant invention.

DETAILED DESCRIPTION OF THE INVENTION

Figure 1:
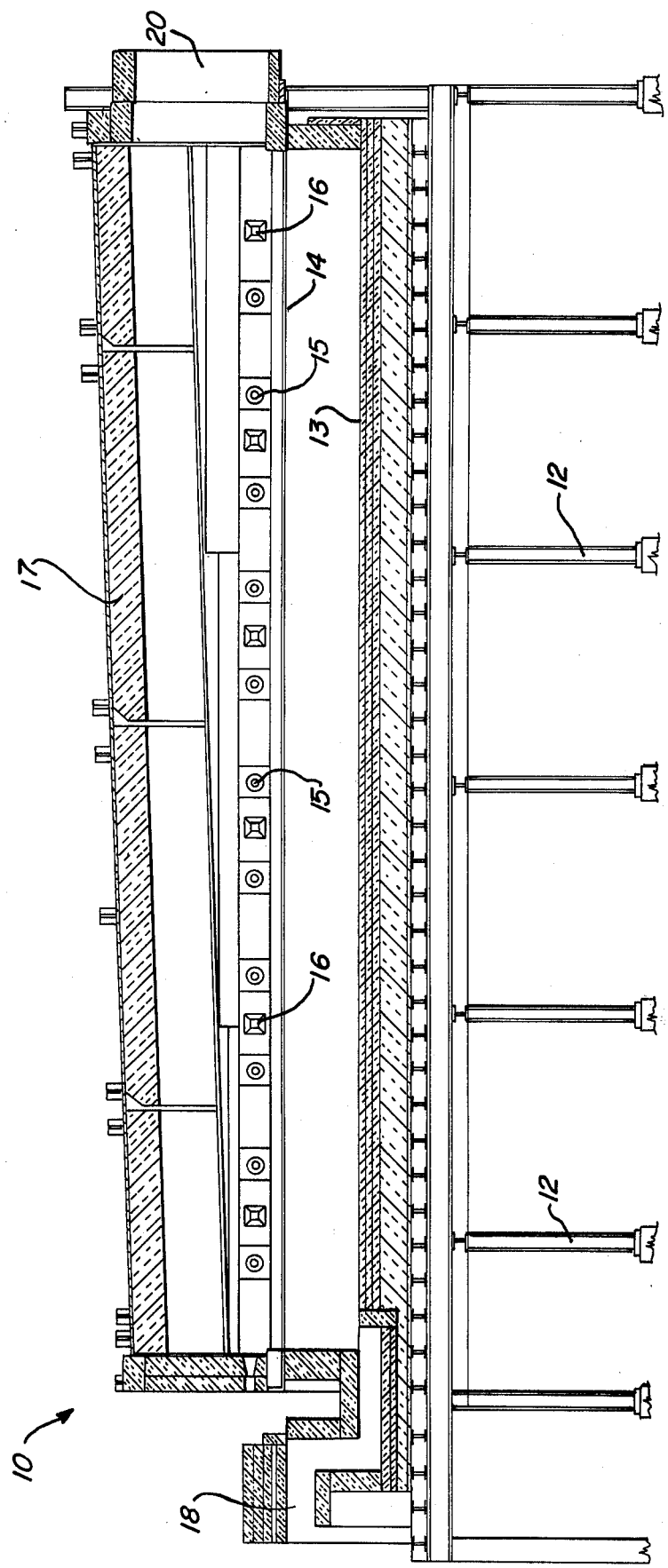
FIG. 1 is a simplified sectional view of a tank furnace.

Turning now to the drawings where like components are designated by like reference numerals throughout the FIGURES, a simplified tank furnace 10 is shown in FIG. 1. Supports 12 underlie the melting portion of tank furnace 10. Melting is accomplished in the volume defined by furnace floor 13 and glass level line 14. Disposed around the periphery of tank furnace 10 and above glass level line 14 are burners 15 and peepholes 16. Fuel from burners 15 are combusted immediately above the glass level line 14, thereby providing heat sufficient to melt the batch and maintain the glass in a molten state through direct firing.

Because of the high temperatures involved, furnace ceiling 17, as well as the other interior portions of the furnace exposed to the temperatures, are constructed of refractory material. Molten glass is removed from the furnace at glass outlet 18 to be processed into useful articles. Combustion gases are removed from the furnace through stack outlet 20. Batch materials are added to the furnace adjacent to stack outlet 20 through inlets not shown as a result of the sectioning of FIG. 1

A burner arrangement according to the instant invention and adapted to function as a burner 15 in tank furnace 16 is illustrated in FIG. 2. As shown, an air feed tube 25 connected to a burner section 26 intersects a coal feed tube 27 at the interface between the air feed tube 25 and burner section 26. The end of burner section 26 includes a beveled portion 28 adapted and configured to interface with flange 36 to connect and secure the burner 26 to the furnace wall 53.

A restriction ring 31 is included internally of air feed tube 25 to enhance mixing and aspiration of the stream from coal feed tube 25 into the stream in air feed tube 25.

The assembly of the apparatus of FIG. 2 will be more readily understood with reference to FIG. 3. As shown, air feed tube 25 is connected to blower 33 by means of conduit 39. Thermometer 36 and Pitot tube 37 are provided to monitor the conditions of the feed air passing through air feed tube 25.

Coal blower 40 forces air into the coal feed system. Coal Pitot tube 41 monitors the velocity in primary tube 42. Pulverized coal is provided in hopper 44 and feeds into primary tube 42 at a rate determined by auger 45 driven by variable speed drive motor 46. Gate valve 48 is provided to terminate the flow of the pulverized coal during transitional operating conditions or in emergencies. Pipe 50, containing thermometer 51, connects gate valve 48 with coal feed tube 27. Thus, the "rich" mixture of coal in air from feed tube 27 is injected into the air stream of air feed tube 25. The admixed mixture is then provided at relatively high velocity through burner section 26 and furnace wall 53 into the atmosphere over the glass melt 55 where the entrained pulverized coal is directly combusted to maintain the melting conditions inside tank furnace 10.

Burner section 26 is connected to furnace wall 53 by means of flange 30 secured in a conventional manner to the furnace wall by fasteners 52.

From the above description, it will be apparent that the burner and pulverized coal feed equipment is quite similar to that used in cement kilns and other such uses. Further, it will be apparent that the interface with the glass furnace is essentially identical to that conventionally used for gas firing of furnaces. However, as will be evident from the following example, the surprising and unconventional aspect of the arrangement is that pulverized coal can be used to produce high-quality glass.

EXAMPLE

One large burner of a 112-ton-per-day glass tank furnace of the type shown in FIG. 1 which had been used for continuous production of amber-colored soda-lime-silica glass for 39 months was replaced with a burner as shown in FIGS. 2 and 3. Twelve larger burners and ten small burners, i.e., equivalent to 19 large burners, were utilized to maintain the proper temperature in the tank furnace. The pulverized coal burner was put into operation and operated for 4 days while glass was produced for use in the formation of glass containers by an Independent Section Machine. Glass containers thus formed were found by careful inspection to be of commercial quality throughout the test. During the test, the coal-air ratio was varied from an excess of coal of 10 percent to an excess of air of 50 percent by volume. The nozzle air velocity was varied from 88 feet per second to 100 feet per second. Various coal particle sizes were utilized. Throughout all the variations, glass quality was maintained and a highly luminous flame was clearly observed and distinguishable from the relatively invisible flames from the conventional burners. As shown in the tables below, glass/stone content, density and light transmittance were monitored carefully. Also, furnace bridgewall temperature was monitored and stack emissions were observed. Finally, the furnace was shut down and inspected for adverse wear adjacent the pulverized coal burner, but no distinct condition was observed relative to the other conventional gas burners.

TABLE I

| COAL ANALYSES | | |
|---|---|---|
| Proximate Analysis (Pct) | As Received | Dry Basis |
| Moisture | 2.92 | — |
| Ash | 9.74 | 10.04 |
| Volatile Matter | 40.21 | 41.42 |
| Fixed Carbon | 47.13 | 48.54 |
| | 100.00 | 100.00 |
| Calorific Value (Btu/16) | 12,657. | 13,038. |
| Sulfur (Pct) | 0.49 | 0.50 |
| Ultimate Analysis (Pct) | As Received | Dry Basis |
| Moisture | 2.92 | — |
| Carbon | 69.97 | 72.08 |
| Hydrogen | 5.20 | 5.36 |
| Nitrogen | 1.41 | 1.45 |
| Sulfur | 0.49 | 0.50 |
| Ash | 9.74 | 10.04 |
| Oxygen (by difference) | 10.27 | 10.57 |
| | 100.00 | 100.00 |

| Screen Size (Mesh) | | Fine Coal wt% | Coarse Coal wt% |
|---|---|---|---|
| Pass | Retained | | |
| | 20 | .0 | .1 |
| 20 | 28 | .0 | .3 |
| 28 | 35 | .2 | .7 |
| 35 | 48 | 1.2 | 1.8 |
| 48 | 65 | 44.0 | 3.9 |
| 65 | 100 | 10.4 | 9.6 |
| 100 | 150 | 13.7 | 13.7 |
| 150 | 200 | 16.1 | 16.0 |
| 200 | | 54.5 | 54.3 |

TABLE II

| | GLASS QUALITY CONTROL (Daily Average) | | |
|---|---|---|---|
| Day | Density g/cm³ | Stone Count (Rejection%) | Light Transmittance % |
| Specs. | 2.500±.0020 | 15 | 15.5 to 30.0 |
| 1st day | 2.5033 | 5 | 19 |
| 2nd day | 2.5012 | 7 | 20 |
| 3rd day | 2.5016 | 10 | 21 |
| 4th day | 2.5009 | 7 | 25 |

TABLE III

| | BRIDGEWALL TEMPERATURES | |
|---|---|---|
| Day | Prior to Coal Firing Temperature °F(Δ) | With Coal Firing Temperature °F(Δ) |
| 1st day | 2620 ± 10 | 2625 ± 10 |
| 2nd day | 2630 ± 15 | 2620 ± 10 |
| 3rd day | 2590 ± 15 | 2625 ± 15 |
| 4th day | | 2630 ± 5 |

From the above, it will be apparent that a direct firing pulverized coal burner providing more than 5 percent of the heat load for 4 continuous days of operation did not adversely affect the quality of the glass produced or the operating conditions in the glass furnace. Further, though the 4-day period is only of a threshold significance, no adverse results such as furnace wall erosion were observed after shutdown of the furnace. In view of the widespread acceptance of the importance of the atmosphere in a glass furnace for glass production, and further in view of the fact that coal does not burn completely and cleanly—particularly with regard to ash content—as does conventional gas fuel, it is clearly a most surprising and unobvious result.

Summarily, the instant invention discloses a method and apparatus for utilizing pulverized coal for direct firing of glass tank furnaces. Contrary to what would be expected, the luminous coal flame directly over the glass batch and molten glass does not adversely affect the quality of the glass produced. Accordingly, the instant invention provides a new and unexpected energy source for the direct firing of glass tank furnaces.

Although only one embodiment of the instant invention has been illustrated and described, it is clear that various changes and modifications will be apparent to those skilled in the art and that such changes may be made without departing from the scope of the invention, as defined by the following claims.

What is claimed is:

1. A method for producing molten glass from a glass batch comprising: placing a quantity of glass batch material in a glass tank furnace, and combusting fluidized, pulverous coal entrained in an airstream to produce a flame in the glass tank furnace immediately above the batch material and resulting molten glass, whereby glass is produced utilizing pulverized coal to direct fire the glass tank furnace.

2. A method for producing molten glass set forth in claim 1 further comprising entraining the pulverous coal in a first airstream within a primary tube, aspirating the entrained coal into a second airstream in an air feed tube, blowing the entrained coal through a burner into the glass tank furnace and combusting the coal to produce a luminous flame.

3. A method for producing molten glass as set forth in claim 2 further comprising exhausting air from a first blower to produce the first airstream in the primary tube, carrying pulverized coal by means of an auger from a hopper to the primary tube for entrainment, exhausting air from a second blower to establish the second airstream in the air feed tube, intersecting the first airstream and the second airstream immediately adjacent the burner, and carrying the pulverous coal entrained in the first airstream through the burner into the furnace by the joined airstreams to form the luminous flame.

4. A method for producing molten glass as set forth in claim 1 in which the heat is generated in the furnace by combusting fuels other than coal simultaneously with combustion of the pulverous coal.

5. A method for producing molten glass from a glass batch comprising providing a quantity of glass batch material in a glass tank furnace, generating first and second airstreams by means of blowers outside of the glass tank furnace, dispensing pulverous coal at a predetermined rate and entraining the coal in the first airstream, mixing the first airstream containing the entrained coal with the second airstream adjacent a burner directed into the glass tank furnace, projecting the entrained coal in the combined airstreams through the burner and into the glass tank furnace, and combusting the pulverous coal within the glass tank furnace immediately above the glass batch material and resultant molten glass in the form of a luminous flame.

6. A method for producing molten glass as set forth in claim 5 further comprising providing a ratio of coal to air ranging from that providing a 10 percent excess of coal to that providing 50 percent excess of air over that required for complete combustion of the coal.

7. A method for producing molten glass as set forth in claim 5 further comprising maintaining the air velocity through the burner into the furnace within a range of from about 88 feet per second to about 100 feet per second.

* * * * *